June 30, 1931.  C. N. SCOTT  1,812,834
INTERNAL COMBUSTION ENGINE OPERATED LOCOMOTIVE
Filed May 13, 1929  10 Sheets-Sheet 1

INVENTOR.
C N. Scott
Jesse R. Stone
ATTORNEY.

June 30, 1931.  C. N. SCOTT  1,812,834
INTERNAL COMBUSTION ENGINE OPERATED LOCOMOTIVE
Filed May 13, 1929   10 Sheets-Sheet 3

Inventor
C.N.Scott
By Jesse R. Stone
Attorney

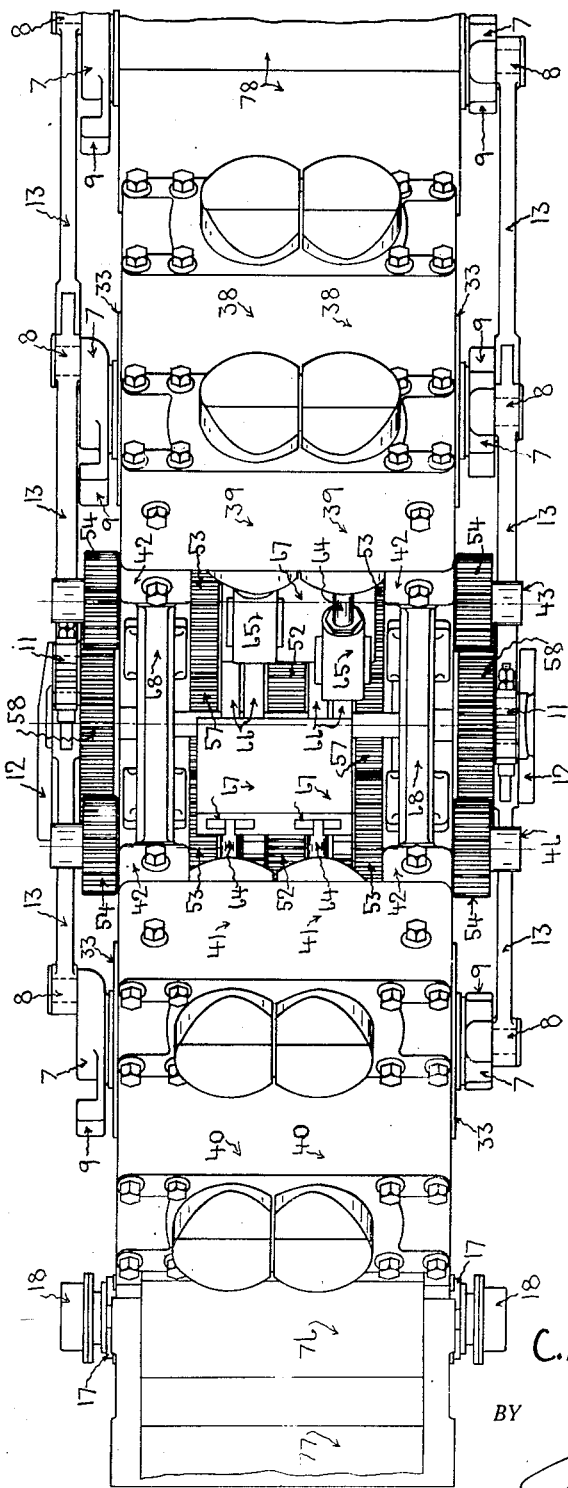

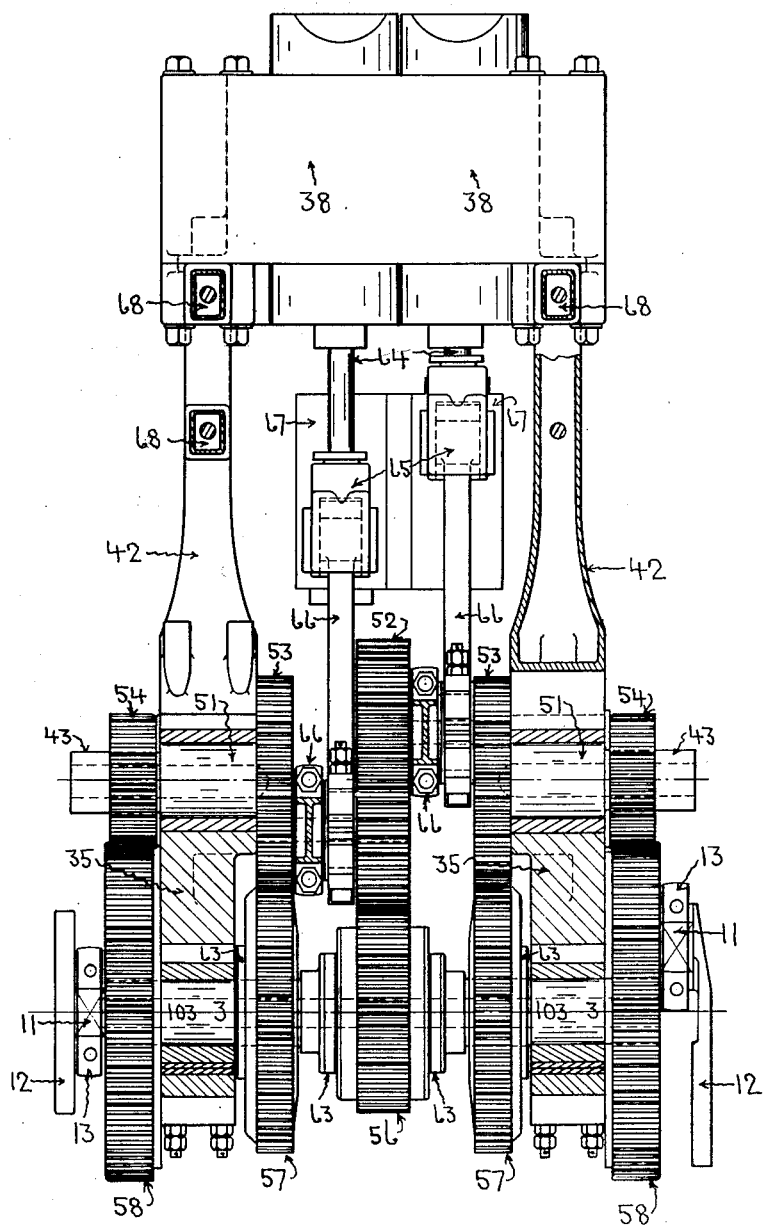

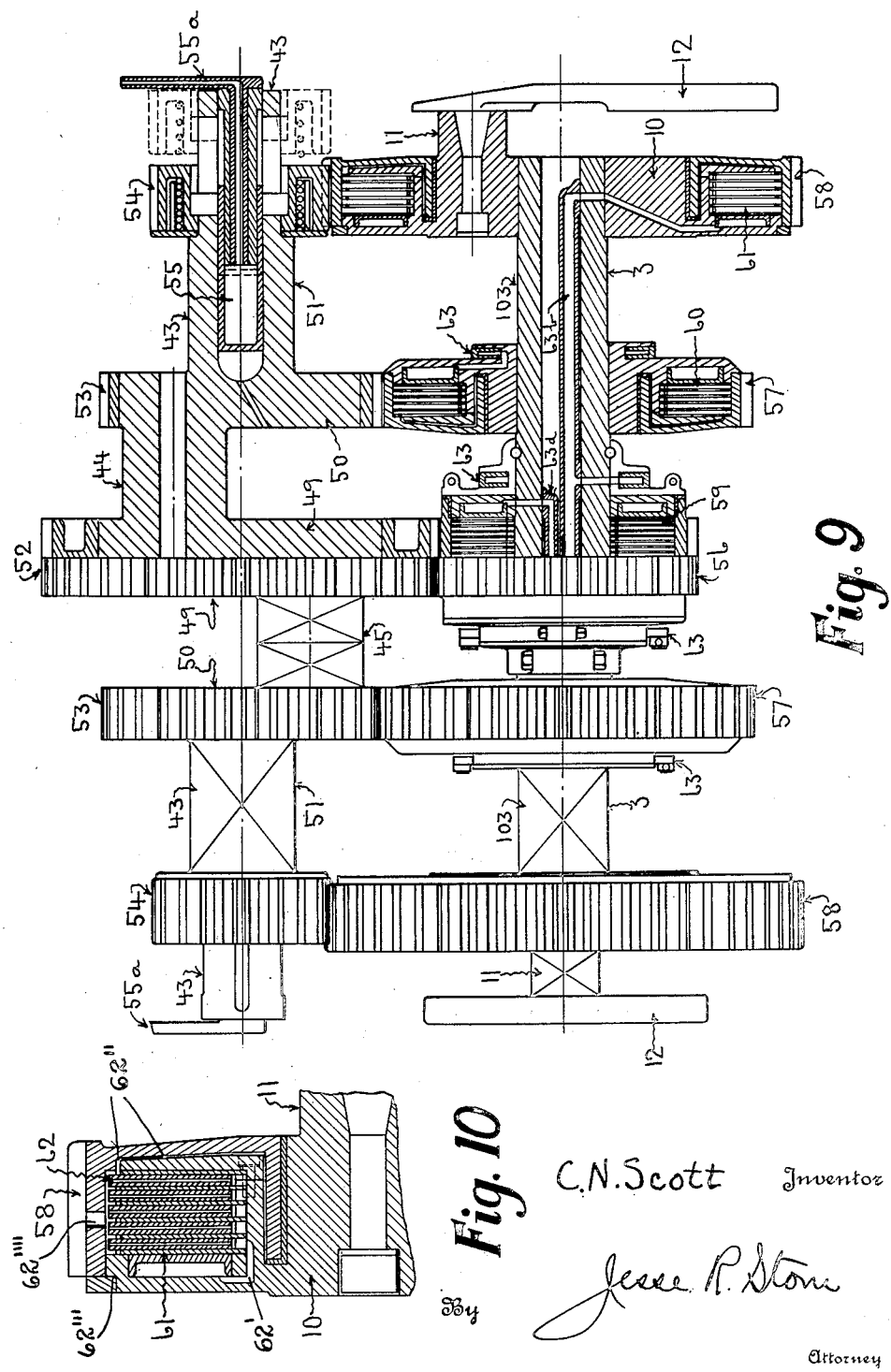

June 30, 1931.  C. N. SCOTT  1,812,834
INTERNAL COMBUSTION ENGINE OPERATED LOCOMOTIVE
Filed May 13, 1929    10 Sheets-Sheet 10
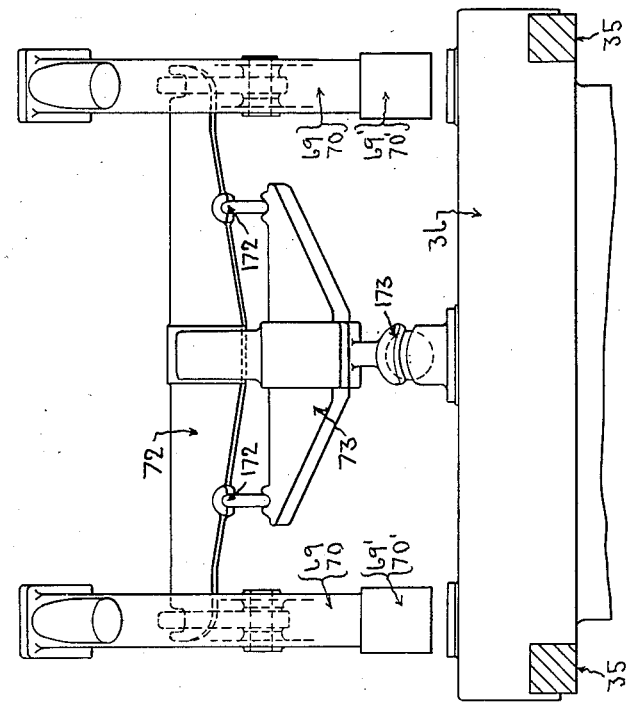
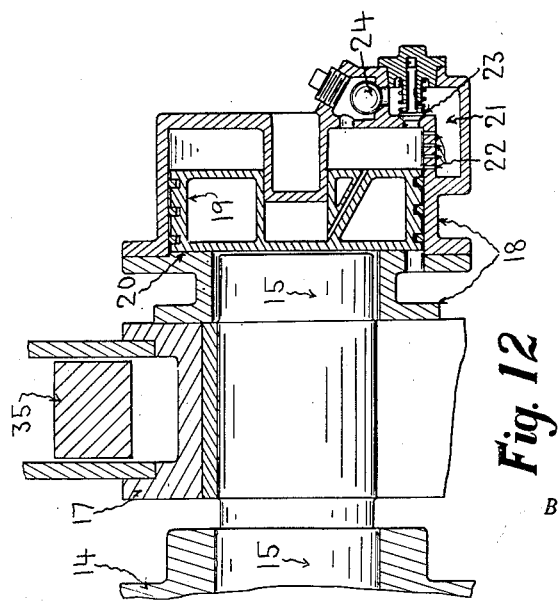
INVENTOR.
C.N. Scott
BY Jesse R. Stone
ATTORNEY.

Patented June 30, 1931

1,812,834

UNITED STATES PATENT OFFICE

CLARENCE N. SCOTT, OF HOUSTON, TEXAS

INTERNAL COMBUSTION ENGINE-OPERATED LOCOMOTIVE

Application filed May 13, 1929. Serial No. 362,558.

This invention relates to Diesel or internal combustion engined locomotives, particularly, but not exclusively, those intended for main line service in hauling trains on steam railroads.

The object of my invention is to provide a locomotive of this character in which internal combustion power cylinders may be employed in a most advantageous manner to deliver to the driving wheels of the locomotive the propelling power requirements ranging between the extremes of maximum torque or turning effort with minimum horsepower applied to the driving wheels with the locomotive at rest, as when starting the train or when accelerating it initially and reduced torque or turning effort but with maximum horse-power applied to the driving wheels with the locomotive traveling at maximum speed. I desire that the power be transmitted from the power cylinders to the driving wheels by mechanical means thruout without the intermediate use of such power relays as electric generators and electric motors, hydraulic pumps and hydraulic motors, air compressors and compressed air motors, or other fluid means of transmission interposed between the power cylinders and the driving wheels.

It is a further object to provide a locomotive in which the horse-power of the Diesel or internal combustion power cylinders is comparable with that of steam locomotives in like service and the tractive force and drawbar pull for starting the train and for low and moderate speed acceleration are likewise comparable.

Another object is to produce a locomotive in which the turning effort applied to the driving wheels when starting the train and in slow and moderate speed acceleration is substantially uniform thruout each revolution of the driving wheels, and in which the train can be started and accelerated at slow and moderate speeds with as great facility and smoothness and as little or less slipping of driving wheels as with steam locomotives of like type.

In my improvement the weight of the power generating and power transmitting mechanisms, their accessories and auxiliaries and of the carrying structure, the running gear, is reduced to within practical railroad limits and distributed among the various wheels of the locomotive without exceeding recognized safe individual wheel roads. Further, prevailing limits of height above rails, width over-all, and rigid wheel base are maintained without uncommon inaccessibility or crowding of parts. Also, the causes which in the use of steam locomotives require the electrification of terminals are eliminated; the exhaust can be effectively muffled, thus eliminating the objectionable noise of the exhaust of steam locomotives; and smoke, spark and cinder nuisances and fire spreading hazards are almost entirely eliminated.

I have as a further object to provide a locomotive in which moderately high piston speeds and moderately high revolving speeds of the Diesel or internal combustion engine are utilized and excessively high speeds avoided and in which the balancing of the reciprocating and revolving parts of said locomotive is effected. Rail pounding resulting from the inherent characteristic inability to fully counterbalance reciprocating and revolving parts in steam locomotives is practically eliminated, thus materially reducing the expense of track, roadbed, bridge and locomotive maintenance and increasing the element of safety. Simple forms of gear wheels can be used for transmitting the power from the engine crank shafts to the main driving shaft to simplify lining them up and maintaining their alignment and also to permit of unavoidable weaving between the two sides of the locomotive without material effect on the gear teeth. All of the axle journal boxes, springs, spring equalizing levers, side connecting rods and their crank pin bearings, and the longitudinal main frames are accessible for observation, operating attention and repairs.

With the above and other objects in view, this invention has particular relation to certain novel features of construction and arrangement and design of the locomotive as a whole and of its constituent and principal parts and use.

For a concrete example of this invention I have selected a type and size of passenger locomotive in very general use in heavy and fast main line passenger service thruout the United States and have adapted my invention, for the purpose of description and illustration, to this particular type and size; altho said invention is readily adaptable to other types and sizes of locomotives for this same service and to this and other types and sizes of locomotives for other classes of service.

The following specification is descriptive of my invention and the following drawings are illustrative of it, wherein Fig. 1 is a righthand side elevation of that portion of my double-acting four-cycle Diesel engined locomotive, extending forward from the center of the main driving shaft but with the housing, side connecting rods, cranks, and counterbalance on the driving axles; crank and clutch and low speed driven gear and counterbalance on the main driving shaft and other minor and irrelevant parts removed and omitted to better show the interior arrangement and parts.

Fig. 2 is a righthand side elevation of that portion of my double-acting four-cycle Diesel engined locomotive, extending rearward from the center of the main driving shaft but with the housing, side connecting rod, crank and counterbalance on the rear driving axle; crank and clutch and low speed driven gear and counterbalance on the main driving shaft and other minor or irrelevant parts removed and omitted to better show the interior arrangement and parts. Figs. 1 and 2 joined together on the center of the main driving shaft would represent the righthand side elevation of the entire locomotive with parts removed and omitted as recited.

Fig. 3 is a righthand side elevation of that portion of my Diesel engined locomotive extending forward from the center of the main driving shaft and corresponds with Fig. 1, but shows the outside view with the housing and parts which are removed in Fig. 1 reinstated in Fig. 3.

Fig. 4 is a righthand side elevation of that portion of my Diesel engined locomotive extending rearward from the center of the main driving shaft and corresponds with Fig. 2, but shows the outside view with the housing and parts which are removed in Fig. 2 reinstated in Fig. 4. Figs. 3 and 4 joined together on the center of the main driving shaft would represent the righthand side elevation or outside view of the entire locomotive with minor and irrelevant parts omitted.

Fig. 5 is an inverted plan of that portion of my Diesel engined locomotive extending forward from the center of the main driving shaft, but with the casing, which encloses the main driving shaft and engine crank shafts and their gears and clutches, removed to better show the interior or cased-in parts and with other minor and irrelevant parts omitted. I have also omitted in this Fig. 5 the upper works of the locomotive such as the power cylinders.

Fig. 6 is an inverted plan of that portion of my Diesel engined locomotive extending rearward from the center of the main driving shaft, but with the casing, which encloses the main driving shaft and engine crank shafts and their gears and clutches removed to better show the interior or cased-in parts and with other minor and irrelevant parts omitted. I have also omitted in this Fig. 6 the upper works of the locomotive such as the power cylinders. Figs. 5 and 6 joined together on the center line of the main driving shaft would represent the inverted plan of the entire locomotive with parts removed and omitted as recited.

Fig. 7 is a partial plan showing that portion of my double-acting four-cycle Diesel engined locomotive extending from a point in front of the forward power cylinders to a point in the rear of the rear power cylinders and is intended to show the general arrangement of the power cylinders and their framing, but with the housing and water cooler removed and with minor and irrelevant parts omitted.

Fig. 8 is a conventional enlarged cross-sectional elevation along the lines $a, b, c, d$, lettered in Fig. 1, and shows the arrangement of the forward power cylinders, their engine frames and connections, the forward engine-crank-shaft, its gears and main bearings, and the main driving shaft, its gears, cranks, clutches and bearings.

Fig. 9 is a conventional enlarged cross-sectional elevation of the locomotive along the lines $a, b, c$, lettered in Fig. 1 and shows in section and in greater detail than Fig. 8 the forward engine-crank-shaft, its gears, crank-discs or crank-webs, crank pins, and main bearings, and the main driving shaft, its gears, cranks, clutches, and bearings.

Fig. 10 is a further enlarged fragmentary cross-section thru a portion of one of the low speed friction clutches and shows a fluid disc cooling feature used to facilitate the slipping of the low speed clutches when starting the train and when moving or accelerating the train at very slow speeds without destructive heating of the clutch discs.

Figure 1:
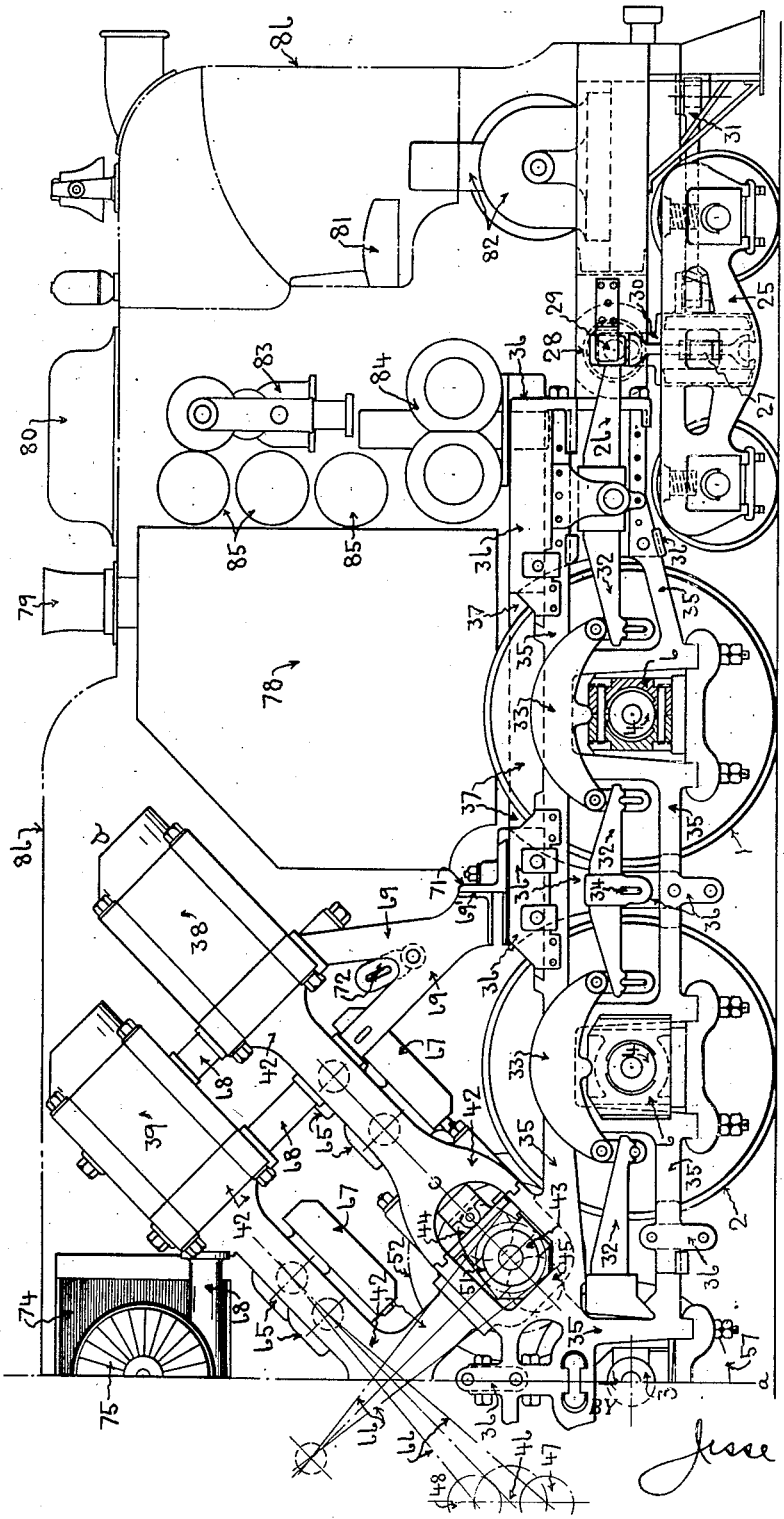

Fig. 11 is a fragmentary enlarged cross-sectional elevation and shows one of the methods used for transferring from the weight-supporting arches or trusses on each side of the locomotive to the cross frame braces, that portion of the weight of the engine and main driving shaft and their accessory parts which is to be carried on the longitudinal main frames of the locomotive forward and rearward of the two pairs of driving wheels which are adjacent to the main driving shaft to distribute and equalize weights over more wheels than the said two adjacent pairs.

Fig. 12 is an enlarged longitudinal sectional elevation thru one of the trailing axle lateral movement resistance cylinders. This figure also demonstrates the same mechanism and principle used in the lateral movement resistance cylinders which are applied to the front of the locomotive to offer resistance to the lateral movement of the leading truck for guiding the front end of the locomotive.

In these drawings I have omitted, for the purpose of simplification and clarification, much minor and irrelevant detail, as for example, the air brakes, which in my locomotive would be applied to all the wheels in a manner very similar to that in which they are applied in steam locomotives of similar type; the general piping of the locomotive; the Diesel power cylinder valves and valve motion which would be of such general design and arrangement as is generally employed in Diesel power engines of similar type and size; the speed regulating governor which could be any one of several different forms of adjustable governors for variable speeds in general use in both steam and internal combustion engines; the oil and cooling water circulating pumps which could be of any suitable type; the Diesel engine starter which would preferably be of the compressed air starting type in general use on internal combustion power engines; the Diesel engine reversing gear which would be similar to that in general use notably in Diesel motor ships; and the locomotive handling devices located in the locomotive driver's cab, such as whistle, bell, train signal, rail sanding devices; Diesel engine reversing gear control; Diesel engine starting control; Diesel engine governor speed adjusting control; speed synchronizing indicator to enable the locomotive driver to synchronize the contacting discs of such clutches as he desires to engage thus reducing wear and shock to the minimum; air brake engineer's valve; electric switchboard; gauges and the clutch control valve for engaging and disengaging the main driving shaft gear clutches.

Referring now more particularly to the drawings wherein like numerals of reference designate similar parts in each of the figures, the numeral 1 represents the front driving wheels. The driving wheels 2 are adjacent to the main driving shaft and are spread apart between axle centers to accommodate the two engine-crank-shafts and the main driving shaft 3 which is placed parallel with and in the same horizontal plane as the driving wheel axles and preferably equidistant between the two adjacent ones. 4 represents the driving wheel axles. 5 represents the outward extensions of the driving wheel axles beyond the driving wheel hubs to form the main axle journals and the axle crank fits. 6 represents the driving axle journal boxes which transmit to the main axle journals that portion of the locomotive weight allocated to the driving wheels and which also transmit to the longitudinal main frames the resultant force which propels the locomotive. 7 and 8 represent, respectively, the crank and crank pins on the ends of the driving wheel axles, which are connected to the main driving shaft crank-pins by side connecting rods. 9 represents the counterbalance weights on the driving axle cranks 7. 10 and 11 represent respectively the cranks and crank-pins on the ends of the main driving shaft. 12 represents the overhung counterbalance weights attached to the ends of the main driving shaft crank-pins. The side connecting rods 13 couple or connect the driving axle crank-pins with the main driving shaft crank-pins. 14 represents the trailing wheels which preferably are flanged with provision made for lateral movement, relative to the trailing axle journal boxes, against resistance in rounding curves and in preventing shimmying on straight track. The lateral clearance between the trailing wheel flanges and rails should be reduced to the minimum and should be less than that between the driving wheel flanges and rails.

The trailing wheel axle 15 is supported in trailing axle journal boxes 17 which are generally similar to the driving axle journal boxes except that the journal brass has contact with only the top half of the axle journal. 18 represents the trailing axle lateral movement resistance cylinders which are secured to the outside faces of the journal boxes. There are pistons 19 in the resistance cylinders which in neutral or straight line running position rest against the neutral stops 20, but which when moved laterally by contact with one end or the other of the trailing axle, as when rounding a curve, move outwardly against fluid pressure preferably taken from the air brake main reservoir. 21 represents the main fluid supply ports in which the required constant resistance fluid pressure is maintained. 22 represents fluid escape ports, between the interior of the resistance cylinders and the main fluid supply ports, so graduated that fluid escape from the resistance cylinders is increasingly resisted to increase fluid pressure within the resistance cylinders and against the pistons to such degree as may be desirable, as the lateral movement of the axle and pistons increases in extent or in velocity of movement. Fluid pressure relief valves 23 are permanently set to relieve excess pressure within the resistance cylinders over that required for the maximum lateral movement resistance desired. 24 represents fluid inlet valves which open inwardly admitting fluid pressure from the main fluid supply ports to the resistance cylinders should fluid pressure in the cylinders as a result of the rapid return of the trailing axle to neutral position cause a drop in fluid pressure within the cylinders below that in the main fluid supply port.

Figure 2:
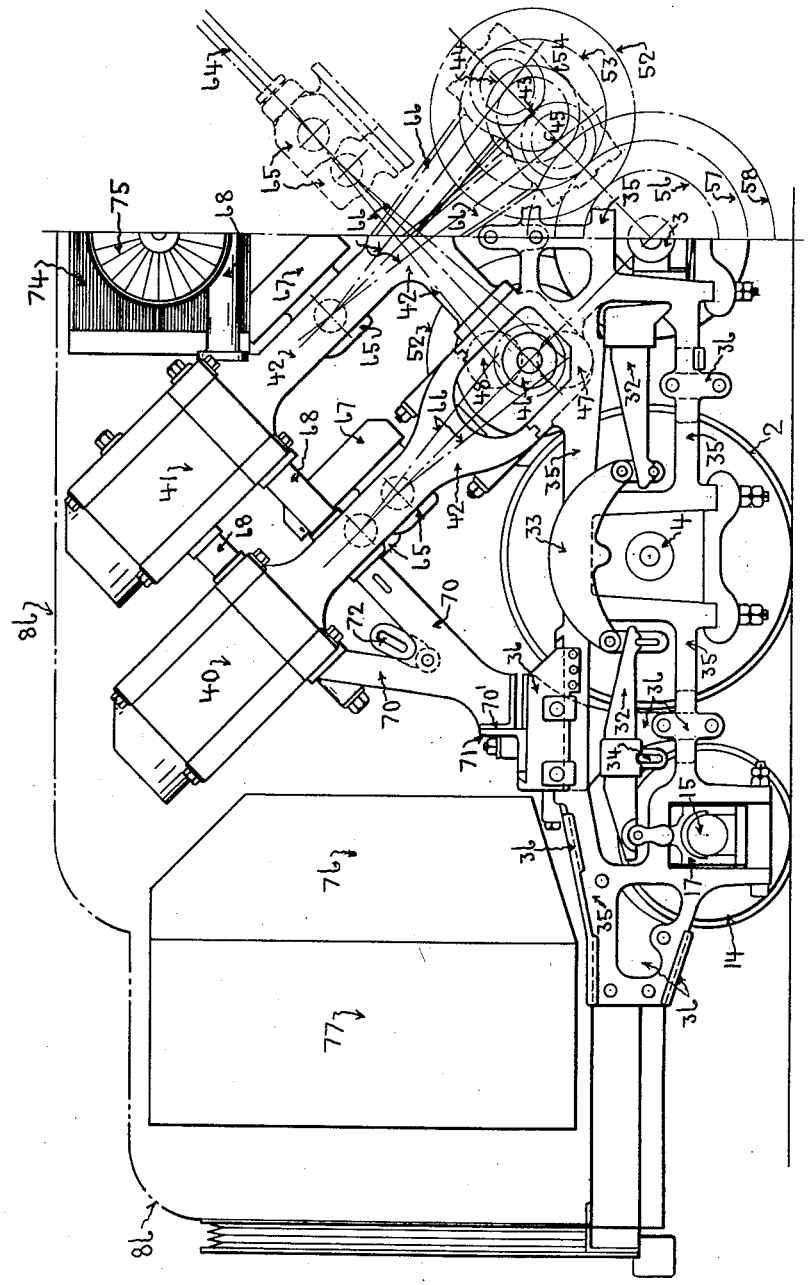
Figure 3:
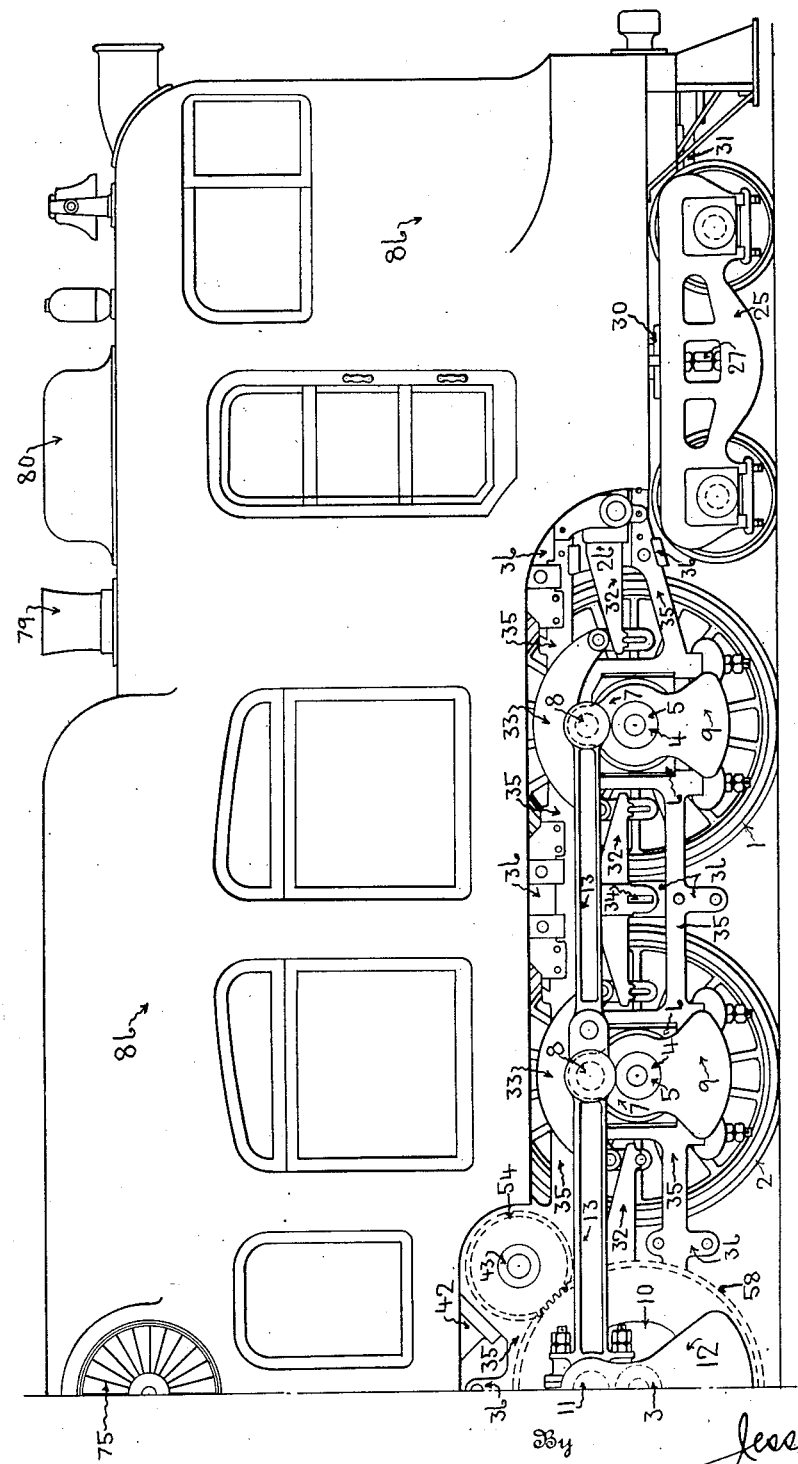
Figure 4:
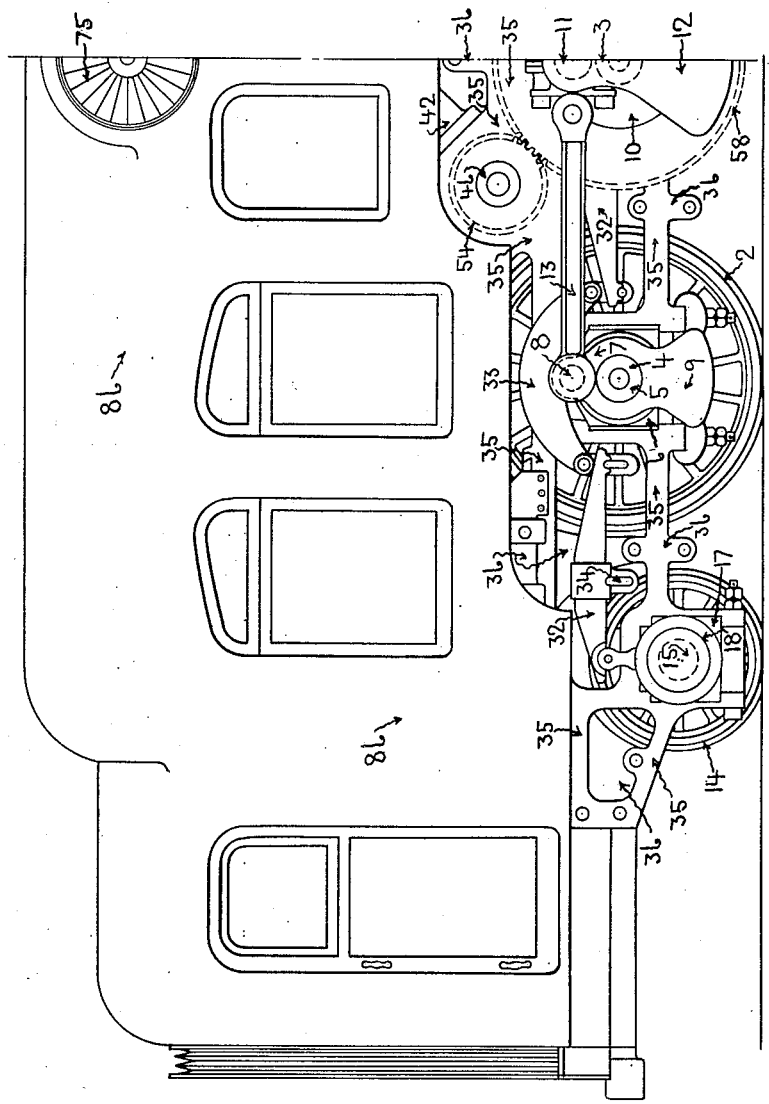
Figure 5:
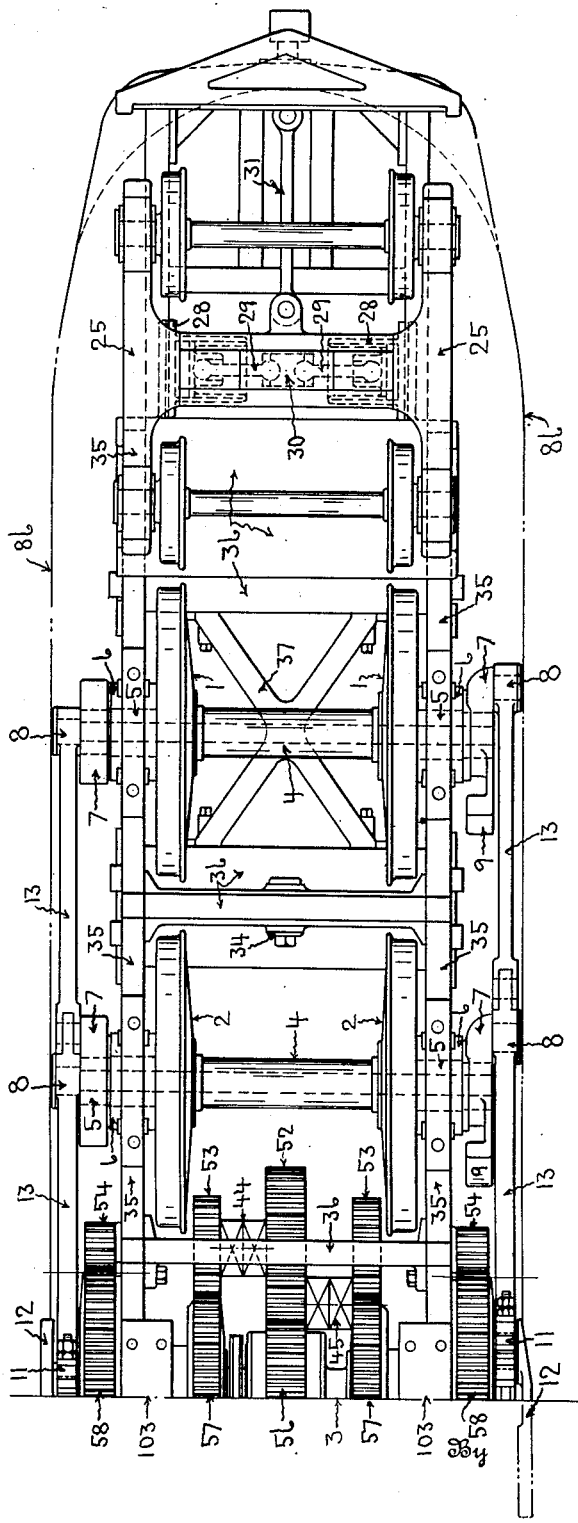
Figure 6:
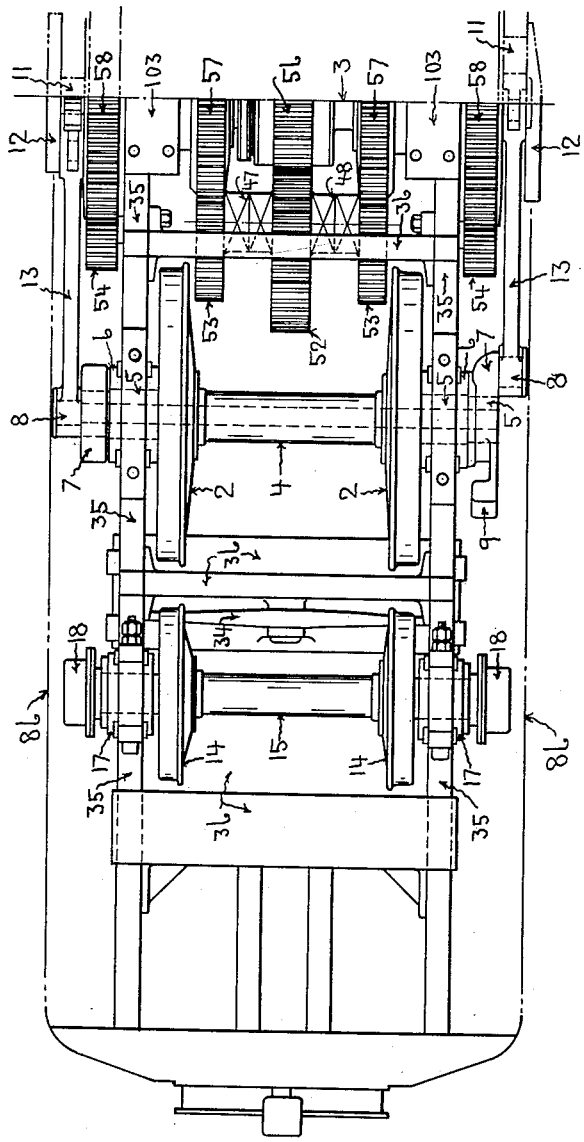

25 represents the leading truck which, in this particular type of locomotive, used for illustrative and descriptive purposes, is four-wheeled. The drawings show a design of truck preferred by me but any suitable design of truck may be used. In the truck design shown, that portion of the weight of each side of the locomotive allocated to the truck is transmitted to the corresponding side of the truck frame by means of a spring 26, which combines the functions of driving and truck spring and of equalizing lever; and flexibility between the spring ends and the truck frame, to permit of horizontal movement of the truck, is secured by the use of ball and socket vertical compression rods 27 between the front ends of the springs 26 and the truck frame. The drawings also show in numeral 28 the same character of lateral movement fluid resistance cylinders applied to the leading truck as is shown applied to the trailing wheel axle, the lateral movement of the leading truck however being transmitted to the fluid resistance pistons by horizontal ball and socket compression rods 29 interposed between a central saddle casting 30 secured to the cross frame of the truck and the said resistance pistons thus providing flexibility for truck movement in all directions. The drawings also show a draw-bar 31 which couples the center saddle casting of the truck frame to the front extension framework of the locomotive. Driving springs 32 are supported upon spring equalizing levers 33. Cross-weight equalizing levers 34 may be used if desired between the spring and spring-equalizing lever systems of the two sides of the locomotive. 35 represents the longitudinal main frames of the locomotive which contain jaws and/or receptacles for the driving and trailing axle journal boxes, main driving shaft bearings and engine crank shaft main bearings. In Fig. 1 I have shown on the vertical center line of the main driving shaft one form of construction in which these main frames to simplify manufacture are each made in two pieces, to which construction this locomotive design lends itself because of the height and width of the frame at this point. In Fig. 2 I have shown on the vertical center line of the main driving shaft another form of construction in which these main frames are each made in one piece should this be preferred. Lateral cross-frame-braces 36 extend across between the two longitudinal main frames and tie them together. A horizontal X brace 37 extends between the two forward lateral cross frame braces to still further provide against the lengthwise weaving or movement of one main frame relative to the other.

38 represents the right and left side forward inclined Diesel or internal combustion power cylinders the pistons of which are connected to the two crank pins of the forward engine-crank-shaft. 39 represents the right and left side forwardly inclined power cylinders, the pistons of which are connected to the two crank pins of the rear engine-crank-shaft. 40 represents the right and left side rearward inclined power cylinders the pistons of which are connected to the two crank pins of the rear engine-crank-shaft. 41 represents the right and left side rearward inclined power cylinders the pistons of which are connected to the two crank pins of the forward engine-crank-shaft. While I have shown all the power cylinders of the simple or single stage expansion type, it should be understood that I do not confine myself to this type and that power cylinders of other types may be used in lieu of those shown. The engine frames or tie-rods 42 extend from the power cylinders to the longitudinal main frames of the locomotive and are secured to the latter at the points where the engine-crank-shaft main-bearings are carried in them.

The forward engine-crank-shaft is shown at 43 and its right side and left side crank pins respectively are indicated at 44 and 45. 46 represents the rear engine-crank-shaft and 47 and 48 its right side and left side crank pins respectively. 49 represents the central discs or crank-webs of the engine-crank-shafts. 50 represents the outer discs or crank-webs of the engine-crank-shafts. 51 represents the engine-crank-shaft main bearings.

52 represents the high speed driving gears mounted on the central discs or crank webs 49 of the engine-crank-shafts. 53 represents the intermediate speed driving gears mounted on the outer discs or crank-webs 50 of the engine-crank-shafts. If preferred by the designer the high speed driving gears may be mounted on the outer discs or crank-webs and the intermediate speed driving gears be mounted on the central discs or crank-webs, and the positions of the driven gears and their clutches on the main driving shaft be changed to correspond. The low speed gear pinions 54 are mounted on the ends of the engine-crank-shafts. These should preferably be mounted in such a manner that they can be disengaged from the engine-crank-shafts or unmeshed from the low speed driven gears during periods when the low speed gears are idling; this because of the high rubbing velocity of the low speed clutch discs against each other and the high rubbing velocity of the bearings carrying the low speed driven gears on the main driving-shaft.

cranks when the locomotive is operating in intermediate or high speed gear if the low speed gear pinions are not disengaged or unmeshed. I have shown these pinions arranged to be unmeshed automatically by springs when the low speed clutches are disengaged and to be thrown into and held in mesh by the application of fluid pressure to plungers 55 after approximate synchronizing of driving and driven gear speeds.

The high speed driven gear 56 is mounted on the main driving shaft. 57 represents the intermediate speed driven gears mounted on the main driving shaft. 58 represents the low speed driven gears mounted on the cranks of the main driving shaft.

The high speed clutch 59, intermediate speed clutches 60, and the low speed clutches 61 are all shown as of the multiple disc friction type engaged and disengaged by application and release of fluid pressure, which is the type preferred by me for this service. Other types of suitable clutches may however be used in lieu of the preferred type. 62 represents a preferred form of friction discs for the low speed clutches in which alternate friction discs, or all discs, if preferred, are made hollow or double to form ample radiating openings or passageways thru them for the passage of cooling fluid while the clutches are being slipped. It is contemplated that only the low speed clutch discs are to be fluid cooled for the reason that it is not necessary or desirable to slip either the intermediate or high speed clutches.

63 represents slip rings which is one of the several devices which may be used for introducing fluid pressure to the clutches. The piston rods 64 are water-jacketed and connect the water-jacketed pistons in the power cylinders with the main crossheads. 65 represents the main crossheads which I have shown of the slipper type as being preferred by me. These crossheads would be equipped with such well known devices as telescoping or swinging water connections for the inlet and outlet of jacket water for cooling the pistons and piston rods.

66 represents the engine main connecting rods which couple the main crossheads to the crank pins of the engine-crank-shafts. 67 represents the main crosshead guides which I have shown of the slipper type as being preferred by me.

68, 69 and 70 represent, respectively, truss or arch-forming braces, forward truss or arch forming braces, and rear truss or arch-forming braces, which form on each side of the locomotive the compression member of the weight distributing truss or arch.

71 represents adjustable brackets or knees mounted on two of the lateral cross frame braces 36 and against which the vertical end faces 69' and 70' of the braces 69 and 70 bear, acting as horizontal thrust abutments for the arches, or transferring to the longitudinal main frames 35 the function of serving as the horizontal tie or tension members of the trusses. Or, if preferred, adjustable horizontal links may be substituted for these brackets 71 in which case one of the link eyes would have its bearing in braces 69 or 70, and the other eye have its bearing in the cross frame braces 36 or on the main frames 35. In any truss or arch construction adopted the lower ends of braces 69 and 70 must be free to move in directions up and down and crosswise of the locomotive in relation to the main frames 35, to permit of untrammelled weaving of said frames in all directions except lengthwise of the locomotive.

72 represents the truss or arch equalizing levers or beams, one of which connects the two braces 69 together and the other connects the two braces 70 together, crosswise of the locomotive. 73 represents springs which exert a force upwardly from two of the lateral cross frame braces 36, at a point on each brace crosswise of the locomotive corresponding with the center of gravity of the supported parts, to the equalizing levers or beams 72. Said force is equivalent to that portion of the weight of the engine and main driving shaft and their accessory parts which is required to be supported or carried forward and rearward of the two pairs of driving wheels which are adjacent to the main driving shaft to equalize or distribute the load onto the various wheels. I have shown these springs semi-elliptic and each having a one point support 173 on the cross frame braces 36 and a two point flexible support 172 on the equalizing levers or beams 72 but this may be reversed at the will of the designer; or full-elliptic springs may be used in lieu of the semi-elliptic springs shown in which case the full-elliptic springs would each have a one point contact with the cross frame braces 36, also with the equalizing levers or beams 72, or other forms of springs may be used, or fluid pressure means for exerting the required upwardly directed force.

74 represents the tubular cooler for cooling the jacket water of the Diesel engine and the fluid which cools the discs of the low speed clutches. Air circulating fans 75 are provided for circulating cooling air thru the cooler 74. There should preferably be two of these fans, one on each side of the locomotive, driven by electric motors which should be reversible in order that advantage can be taken of wind direction.

76 represents the fuel storage tank. 77 represents the water storage tank in which water is carried for supplying the train heating boiler and for making up any loss by leakage of jacket-cooling water. The train heating boiler 78 may or may not be supplemented by a heater for utilization of a part of the heat of the engine exhaust. Said boiler has a smoke stack 79 which may also be used as the outlet for the exhaust from the power cylinders. 80 represents the forward sand box. The rear sand box may be placed above the locomotive housing at the rear of the locomotive, or in other suitable location.

The locomotive driver's seat, shown at 81, preferably should be arranged so that it and that part of the interior partitions forming the locomotive driver's cab, to which it is secured, can be unfastened and tipped forward to provide additional head room for making repairs to the machinery underneath it.

82 represents the internal combustion engine and direct connected electric-generator which supplies electric current for lighting the locomotive and train, for driving the air brake pumps, for driving the jacket water and clutch fluid circulating pumps, for driving the air circulating fans 75 and for other uses to which electricity may be put. This electric generating unit 82 should preferably be supplemented by an auxiliary electric generator driven from one of the locomotive axles and also by an electric storage battery.

83 represents the motor driven air-brake pumps. 84 represents the auxiliary air compressor which should preferably be driven by a direct connected or geared internal combustion motor and which supplies compressed air under high pressure to the storage bottles 85 for use in injecting the fuel into the power cylinders if that method of fuel injection is adopted, in starting the Diesel engine, and for other uses to which such high pressure air may be put. This auxiliary air compressor 84 should preferably be supplemented by another driven from one of the locomotive axles or from one of the engine crank shafts. 86 represents the housing of the locomotive which should be provided with ample windows and doors and with smooth coach-like exterior. The roof of this housing over the engine power cylinders should be of sectionalized construction so that sections can be readily removed for convenience in making repairs to or in removing internal parts of the locomotive.

It will be seen from the foregoing description and from the drawings:—

First, that I use a main driving shaft 3, from which the propelling power is transmitted to the driving wheels 1 and 2 thru side connecting rods 13, and I place its axis parallel with and in the same horizontal plane as the driving wheel axles 4 to permit of vertical operating movement of either relative to the other without materially affecting or changing the distance between centers of driving shaft and axles.

Second, that I place the crank pins 11 of the main driving shaft 3, and the crank pins 8 of the driving wheel axles 4 of each side of the locomotive all in alignment with each other so that the propelling force is transmitted thru the side connecting rods 13 in a straight line without crank pin or connecting rod offsets or relays. With this construction each of the driving axle crank pins 8 takes from its string of side connecting rods 13 only that force which is to be transmitted to its own individual driving axle.

Third, that I use two short engine crank shafts 43 and 46 in lieu of one long one and place them crosswise of the locomotive with their axes parallel with the axis of the main driving shaft 3 so that I am enabled to use simple spur gear wheels or herringbone tooth gear wheels for direct power transmission between the engine crank shafts 43 and 46 and the main driving shaft 3, and thus avoid the use of such complex and undesirable forms of gears for this service as bevel, worm and spiral. That I place one of these engine crank shafts 43, the forward one, above and forward of the main driving shaft 3, and the other engine crank shaft 46, the rear one, above and rearward of the main driving shaft 3. The distance between the center of each of these engine crank shafts 43 or 46 and the center of the main driving shaft 3 corresponds with the "center distance" between the gear wheels used.

The horizontal distance between the centers of the two engine crank shafts 43 and 46 is determined by the outside diameter of the high speed gear wheels 52 on the engine crank shafts 43 and 46 plus the width of that lateral cross frame brace 36, which ties the two longitudinal main frames 35 of the locomotive together at that point, plus clearance; or to give clearance for connecting rod ends; and generally develops for convenience of design and manufacture into the general rule that the axis or center of the forward engine crank shaft 43 and the axis or center of the rear engine crank shaft 46 rest on lines drawn from the center of the main driving shaft 3 upward and forward and upward and rearward respectively at an angle of 45° relative to a vertical line drawn thru the center of the main driving shaft 3. This angle may, however, be reduced or increased at the discretion of the designer. That I place high intermediate, and low speed driving gear wheels, 52, 53 and 54, respectively, on these two engine crank shafts 43 and 46, and mesh them with the corresponding driven gear wheels 56, 57 and 58 on the main driving shaft 3 in the manner shown in the drawings and previously described herein. It will also be seen that each one of the driven gear wheels on the main driving shaft meshes or engages with its two corresponding driving gear wheels one on each of the two engine crank shafts and that the forward and rear engine crank shafts 43 and 46 are coupled together only by reason of the fact that they are geared together indirectly thru the common driven gear wheels 56, 57 and 58 on the main driving shaft 3.

It will further be seen that by thus meshing two driving gear wheels with one common driven gear wheel I reduce the combined length of the faces of the high intermediate and low speed driven gear wheels 56, 57 and 58 on the main driving shaft 3 by approximately one-half, this enabling me to accommodate all the driving and driven gear wheels and the individual clutches 59, 60 and 61 on the engine crank shafts 43 and 46, and the main driving shaft 3, and keep within the prevailing over-all width limit of the locomotive. There are other advantages which result from this two engine-crank shaft arrangement which appear elsewhere in this description.

Fourth, that I use two longitudinal main frames 35 generally similar to those used in steam locomotives except that between the two pairs of driving wheels 2 which are adjacent to the main driving shaft 3, I widen each frame and form in it seats or receptacles for the bearing which carries its half of the main driving shaft 3 and for the two main bearings, which carry their halves of the forward 43 and rear 46 engine-crank-shafts. I also provide near the latter, faces to which are secured the engine frames 42 or tie rods which extend upwardly and tie the power cylinders 38, 39, 40 and 41 to the said main frames 35. This construction provides a straight line self-contained framework extending from the power cylinders 38, 39, 40 and 41 to the driving axle journal boxes 6 on each side of the locomotive to resist the forces acting between the power cylinders and the engine crank shaft bearings, between the engine crank shaft bearings and the driving shaft bearing and between the driving shaft bearing and the driving axle journal boxes. I provide rigidity in each main frame immediately around and between the three shaft bearings referred to and customary flexibility in the remainder of the frame.

Fifth, that in order to provide room crosswise of the locomotive between the two main bearings 51 of each engine crank shaft 43 or 46 for the accommodation of the necessary crank pins 44, 45, 47 and 48 and crank discs 49 and 50, or crank webs and the high and intermediate speed driving gear wheels 52 and 53 on said engine crank shafts; and also room between the two bearings 103 of the main driving shaft 3 for the accommodation of the necessary high and intermediate speed driven gear wheels 56 and 57 and their individual clutches 59 and 60 on said driving shaft, I place the two longitudinal main frames 35 of the locomotive outside of the driving and other wheels (instead of inside as is customary in steam locomotives) and carry them by means of springs 32, spring-equalizing levers 33 and axle journal boxes 6 and 17 on axle journals formed by extending at 5 the axles 4 and 15 outwardly beyond the wheel hubs. That I still further extend at 5 the driving axles 4 outwardly beyond the driving axle journal boxes 6 to form seats or fits for the cranks 7 which I place on the ends of the driving wheel axles 4, and thru which the propelling force is transmitted by the side connecting rods 13 to the driving axles 4 and driving wheels 1 and 2. The side faces of the driving axle journal boxes 6 bear inwardly against the outer faces of the driving wheels hubs 1 and 2 and bear outwardly against the inner faces of the driving axle cranks 7, thus providing double lateral thrust bearing surfaces. Other advantages which I derive from placing the main frames 35 outside of the wheels appear elsewhere in this description.

Sixth, that by placing the longitudinal main frames 35 outside of the driving wheels 1 and 2, I am enabled to accommodate two center-crank crank-pins 44 and 45, 47 and 48 on each engine crank shaft 43 and 46 and to make each crank pin of sufficient length to accommodate the crank and bearings of two connecting rods 66 side by side on the same crank pin, thus accommodating four connecting rods 66 on each engine crank shaft or eight connecting rods on the two engine crank shafts 43 and 46, enabling me to use eight power cylinders 38, 39, 40 and 41. I place the power cylinders in pairs and those of each pair side by side crosswise of the locomotive. In order to secure the maximum diameter of bore for all cylinders alike I alternate in connecting them to the crank pins, that is, if the connecting rod from one of a pair of power cylinders connects to the righthand half of its crank pin the connecting rod from the other cylinder of that same pair would likewise connect to the righthand half of the other crank pin on the same engine crank shaft and similarly the lefthand connecting rod connects with the lefthand half of one crank pin and lefthand half of the other crank pin. I place the two crank pins 44 and 45, 47 and 48 of each engine crank shaft 43 and 46 at substantially 180° of each other in direction of rotation and since one power cylinder of each pair is connected to one of the crank pins and the other power cylinder of the same pair is connected to the other crank pin of the same crank shaft it will be seen that the reciprocating and revolving parts of the two cylinders in each pair are working at 180° of each other and accordingly balance each other (en masse).

Seventh, that I mesh or engage the driving gear wheels 52, 53 and 54 of the two engine crank shafts 43 and 46 with their corresponding common driven gear wheels 56, 57 and 58 on the main driving shaft 3 in such sequence that the lefthand crank pin 45 on the forward engine crank shaft 43 and the corresponding or lefthand crank pin 48 on the rear engine crank shaft 46 (and similarly the righthand crank pins 44 and 47 of the two engine crank shafts 43 and 46) will be at approximately 135° of each other in direction of rotation. This crank pin sequence results in uniformity of turning effort on the crank pins 11 of the main driving shaft 3 as will be seen from the following:—with eight double-acting four-cycle power cylinders, four, 38 and 39, forwardly inclined and four, 40 and 41, rearwardly inclined at approximately 90° to each other as shown on the drawings and described elsewhere in this specification, I secure eight impulse or power strokes of the power pistons equally overlapped and distributed and each impulse following the preceding impulse 45° apart thruout one complete revolution of the two engine crank shafts 43 and 46, and no two impulses coinciding. It will also be seen that with a low speed gear ratio of 1 to 2.7 which is the ratio I have selected for descriptive and illustrative purposes, I secure twenty-one and six-tenths (21.6) equally distributed and overlapped power strokes of the power pistons for each revolution of the driving wheels, equivalent to an impulse every sixteen and two-thirds (16⅔) degrees of each revolution of the driving wheels and this with the low speed clutches completely engaged.

It will further be seen that in low speed gear (even without clutch slipping) the turning effort applied to the driving wheels, and the tractive force and the draw-bar pull are practically even and continuous. This disposition and sequence of the engine crank pins 44, 45, 47 and 48 in addition to balancing the reciprocating and revolving parts of the two cylinders of each pair of power cylinders, also results in almost complete balancing between the reciprocating and revolving parts coupled to the left-hand crank pin 45 of the forward engine crank shaft 43 and those coupled to the corresponding or left-hand crank pin 48 of the rear engine crank shaft 46; and similarly between those coupled to the right-hand crank pin 44 of the forward engine crank shaft 43 and those coupled to the right-hand crank pin 47 of the rear engine crank shaft 46. For example, when the left-hand crank pin 48 of the rear engine crank shaft 46 is at its highest position the corresponding or left-hand crank pin 45 of the forward engine crank shaft 43 is only 45° removed from its lowest position, thus reducing to a practical extent the tendency to rocking of the locomotive which would exist if the corresponding crank pins of the forward and rear engine crank shafts were both in corresponding positions in their crank pin circles.

Eighth, that with this engine crank shaft and main driving shaft arrangement and construction and with the longitudinal main frames of the locomotive placed outside of the wheels, I am enabled to accommodate Diesel or internal combustion power cylinders of sufficient number and size to develop a total horse-power comparable with that developed and required in steam locomotives of like type and size and for like service.

Ninth, that in order to minimize weight and at the same time to secure ample torsional and transverse stiffness or rigidity in the engine crank shafts 43 and 46 and main driving shaft 3 between their carrying bearings in main frames 35, and also in the driving wheel axles 4, I make these shafts and axles comparatively large in diameter thruout and of hollow construction. I utilize the hollow center of the main driving shaft for the installation of fluid carrying conduits 63b and 63d thru which fluid pressure is applied and distributed and released to and from the several clutches on the main driving shaft. These conduits connect the clutches with the slip-rings 63 shown in the drawings or with such other fluid introducing means as may be used in lieu of slip rings. Also, I utilize the hollow centers of the engine crank shafts 43 and 46 at their ends for the installation of pistons or plungers 55 which, acted upon by fluid pressure in conduit 55a under the control of the locomotive driver, move into and retain in mesh the low speed pinions 54 on the ends of the engine crank shafts 43 and 46 with the low speed driven gear wheels 58 on the cranks 10 of the main driving shaft 3, while the locomotive is operating in low speed gear as described elsewhere in this description and specification.

Tenth, in Diesel engines the high weight per delivered horsepower results from the high initial pressure in the power cylinders and the corresponding large initial load on the power pistons. This large initial load is the factor which primarily determines the sizes of the reciprocating and revolving parts and of the fixed parts which resist this force. In a Diesel engined locomotive it is particularly necessary that the weight per horsepower of the Diesel engine parts be very materially reduced below that of Diesel engines in marine and stationary services. It will be seen that I accomplish this in the following manner; I use moderately high piston and revolving speeds and yet avoid excessively high speeds. I use double acting power cylinders instead of single acting thus effecting dual use of power transmitting and force resisting parts and bearings or journals. By reason of my arrangement of driving gear wheels 52 and 53 which transmit the power from each engine crank shaft directly away from the crank discs 49 and 50, or crank webs, to which the crank pins 44, 45, 47 and 48 are directly connected, while operating in high or intermediate speed gears, and divided between the two ends of each crank shaft, to which the two crank pins are also directly connected, while operating in low speed gear, I am enabled to reduce the number of main bearings required to only two on each engine crank shaft or to only four for the complete Diesel power unit. This compares with nine which would be required in regular Diesel construction in which all of the eight cylinders would be placed in line and the power entirely transmitted thru or taken off from one end of the engine crank shaft. I connect four of these double-acting power cylinders 38 and 39 to the engine crank shafts 43 and 46, at an angle of approximately 90° from the other four power cylinders 40 and 41 and am thus enabled to again double the utilization of the main bearings and crank pins and crank discs or webs and of the driving gears on the engine crank shafts without any material increase in the number or size or weight of said common parts over what would be required if only four of these similarly inclined cylinders were used, this because the four cylinders which are disposed at 90° from the other four deliver their initial loads to the same common parts but at separate intervals 90° apart from the said other four cylinders in the direction of rotation of the engine crank shafts. And to still further assist in effecting this multiplex utilization of said common parts I time the sequence of the cycles of the power cylinders so that instead of four impulses being applied to any one crank pin in a single revolution and then be followed in that same crank pin by a complete revolution of cyclic idling, two diametrically opposed impulses are applied to one of the crank pins of a crank shaft and two diametrically opposed impulses are applied to the other crank pin of the same crank shaft in the same revolution but at 90° apart in the direction of rotation from the two impulses to the other crank pin.

Eleventh, that by using only two supporting bearings or journals 51 on each of the engine crank shafts 43 and 46 and 103 on the main driving shaft 3 I very materially simplify the operating problem of lining up and spacing the said three shafts with each other and with the driving axles 4 and of maintaining this alignment and spacing, and that further I am enabled to thus secure flexibility of construction which will permit of considerable weaving or movement of the two longitudinal main frames 35 with relation to each other without resulting strains on said shafts or main frames. In other words, I am enabled to avoid that rigidity of construction which would be necessary in a bearing supporting member to maintain alignment between the several bearings or journals of a shaft if more than two bearings or journals are used.

Twelfth, that by inclining the power cylinders, 38, 39, 40 and 41, forward and rearward at an angle of approximately 90° apart as shown on the drawings, I secure in addition to the other advantage recited, these further advantages:—I am enabled to keep the height of the locomotive above the rails within the prevailing height limit; to more effectively distribute or spread the weight of the Diesel engine parts in forward and rearward directions from the main driving shaft; to lower the center of gravity of the locomotive; and to dispense with the use of power piston tail rods and outboard crossheads and their outboard guides for the reason that with the power cylinders reclining at a 45° angle these comparatively small power pistons can be carried on the bores of said cylinders.

Thirteenth, that by inclining the power cylinders 38, 39, 40 and 41, and consequently their engine frames 42, or tie rods, which secure them to the longitudinal main frames 35, and by connecting them together on each side of the locomotive by truss or arch forming braces 68, 69 and 70, and by cross connecting the truss or arch so formed on each side of the locomotive with the truss or arch so formed on the other side of the locomotive by means of the equalizing levers or beams 72, and by supporting these equalizing levers or beams each on one-point upward-force-exerting means 73 from the lateral cross frame braces 36 which tie the two longitudinal main frames 35 together, I secure rigidity in this weight supporting weight-distributing truss or arch framework where rigidity is required and is permissible, and at the same time secure ample flexibility where the distributed weight is carried on or transmitted to the longitudinal main frames 35 of the locomotive forward and rearward of the two pairs of driving wheels 2, which are adjacent to the main driving shaft 3.

Fourteenth, that I use for the high, intermediate and low speed transmissions on the main driving shaft 3, individual clutches 59, 60 and 61 preferably of the multiple disc friction type engaged and disengaged by the application and release of fluid pressure to and from annular pistons or diaphragms which when pressure is applied press the friction discs together and when pressure is released are returned to their initial position of disengagement by springs placed between said discs. That for the driving and driven friction discs I use materials dissimilar in character such as bronze and steel or cast iron and steel. That I so fix the sizes and number of these discs that contact pressure or load between or on said discs is less than 50 pounds per square inch of surface. That in the low speed clutches 61 which will be subjected to considerable slippage between driving and driven discs while starting the train and during very slow speed acceleration of same, I arrange for cooling the discs 62 by making the alternate discs with passages radiating in their interior thru which cooling fluid, preferably oil, will be circulated from the inner to the outer periphery of said discs while the clutch is being slipped or in contact. A preferred method of conducting cooling fluid to and away from the clutch discs is shown in Fig. 10. 62' represents the fluid port which connects the annular cylinder, to which fluid pressure is admitted against the annular clutch piston to force the clutch discs together when engaging the clutch, with the interior space occupied by the clutch discs. Cooling fluid then passes from this latter space at the inner periphery of the discs through the radiating cooling passages in said discs to a space at the outer periphery of the discs from which space it escapes through the passage 62" and the tolerance clearance of the bearing of the gear 58 on the crank 10 and also through the tolerance clearance between the gear 58 and the crank 10 at 62''', to the gear case which encloses the low speed gears and their clutches. Or, if preferred, cooling fluid may be carried away from the space at the outer periphery of the clutch discs through suitable holes 62'''', drilled through the web or periphery of the gear 58 to spill the cooling fluid into the said gear case. From this gear case the cooling fluid is understood as being taken by suitable pumps and forced through the cooler 74. The cooling fluid inlet port 62' should be of small carrying capacity as compared with that of 63b through which fluid pressure is applied to the annular cylinder to operate the clutch in order that the application of fluid pressure to the annular piston to engage the clutch would not be materially affected by the escape of the relatively small quantity of fluid required to cool the clutch discs. This is a feature of prime importance in Diesel or internal combustion engined locomotives, in which the engine must be kept running at a speed sufficiently high to insure against its stalling, when starting and when initially accelerating the train. The application and release of pressure for engaging and disengaging the several clutches would be controlled and distributed by a hand-operated selective clutch control valve placed in the locomotive driver's cab and so interlocked that only the clutch or clutches of one gear speed could be engaged or be in engagement coincidentally.

Fifteenth, that I use a variable speed, engine speed controlling governor which is adjustable from the locomotive driver's seat to maintain, within customary variation, any engine speed that the locomotive driver may desire to be periodically maintained.

Sixteenth, that I place the water and fuel storage tanks 77 and 76 at the rear end of the locomotive over and rearward of the trailing wheels 14 to minimize as far as possible the variation of load on driving wheels resulting from the varying quantities of water and fuel in these tanks at different periods of the run.

Seventeeth, that I place the train heating boiler 78 and most of the other auxiliary equipment and machinery at the forward end of the locomotive in order to secure two-man contact during the run and to effect proper distribution of weight to the leading truck 25 and to the forward pair of driving wheels 1.

Eighteenth, that I place the locomotive driver's cab at the extreme front end of the locomotive housing.

Nineteenth, that for the housing 86 of the locomotive I use light weight, smooth exterior, coach-like construction.

Twentieth, I make provision for running the locomotive backwards by using a reversible valve motion for operating the inlet and exhaust and fuel injection valves of the Diesel power cylinders similar to that well known and in general use in reversing the direction of rotation of Diesel engines in motor ships. I use this engine reversing feature in preference to using reversing gear wheels on the engine crank shafts and main driving shaft because of the greater simplicity and greater range of locomotive speeds in running backwards and of its greater effectiveness.

Twenty-first, in operating internal combustion locomotives it is necessary that the speed of the engine be under the control of a speed governor at all times and that the speed governor be readily adjustable by the locomotive driver in the locomotive driver's cab to maintain substantially any engine speed which the locomotive driver may wish to be periodically maintained to suit the varying requirements of train speed and resistance. To accomplish this I use an adjustable variable speed governor to regulate or vary the quantities of fuel admitted to the power cylinders to attain and maintain any engine speed for which it is periodically adjusted or set by the locomotive driver. This governor may be one of several well known forms or types in general use in steam and internal combustion engine variable speed regulation.

I claim:

1. In a locomotive, a plurality of pairs of driving wheels, axles therefor, a driving shaft parallel with said axles, a forward engine-crank-shaft, a rear engine-crank-shaft, eight internal combustion power cylinders, four of them connected operatively with the two crank pins of the forward engine-crank-shaft and four of them connected to the two crank pins of the rear enginecrank-shaft, two of the four which are connected to the forward engine-crank-shaft and two of the four which are connected to the rear engine-crank-shaft being inclined upward and forward from their respective crank shaft axial centers, and two of the four which are connected to the forward engine-crank-shaft and two of the four which are connected to the rear engine-crank-shaft being inclined upwardly and rearwardly from their respective crank shaft axial centers.

2. In a Diesel or internal combustion engine locomotive, a plurality of pairs of driving wheels, axles therefor extending outwardly at both ends beyond the hubs thereof, axle journals formed on said extensions next to said hubs, cranks and crank pins on the ends of the said driving wheel axles adjacent said journals, a main driving shaft, a crank and crank pin on each end thereof, the two crank pins being at approximately 90° of each other in direction of rotation, said main driving shaft being parallel with and in the same horizontal plane as the two adjacent driving wheel axles; connecting rods between the main driving shaft crank pins and the crank pins of the cranks on the ends of the driving wheel axles, two two-throw engine-crank-shafts placed crosswise of the locomotive with their axes parallel with the axis of the main driving shaft, each engine-crank-shaft consisting of a central disc, two main crank pins, one on each side of said central disc, two outer discs, one on the outer end of each main crank pin, two axial cylindrical members, each extending outwardly from its outer disc to form a main bearing or journal adjoining each outer disc, and a driving gear seat adjoining each main bearing or journal, one of said engine-crank-shafts being located above and forward of the main driving shaft and the other of said engine-crank-shafts being located above and rearward of the main driving shaft in a position corresponding with that of the other engine-crank-shaft; driving gears on said discs and on the outer ends of said engine-crank-shafts, driven gears on the main driving shaft and on the cranks at the ends of said main driving shaft, all in positions corresponding to and adapted to mesh with said driving gears on the engine-crank-shafts, each of said driven gears adapted to mesh coincidentally with its two corresponding driving gears, one on one of the engine-crank-shafts and one on the other, an individual clutch on each driven gear arranged to engage and release the same from engagement with the main driving shaft and a main frame on each side of the locomotive placed outside of the driving wheels and containing means for accommodating the axle journal boxes, the main driving shaft bearing and the engine-crank-shaft main bearings.

3. In a Diesel or internal combustion engined locomotive, a plurality of pairs of driving wheels, axles therefor extending outwardly at both ends beyond the hubs thereof, axle journals formed on said extensions next to said hubs, cranks and crank pins on the ends of the said driving wheel axles adjacent said journals, a main driving shaft, crank and crank pin on each end thereof, the two crank pins being at approximately 90° of each other in direction of rotation, said main driving shaft being parallel with and in the same horizontal plane as the two adjacent driving wheel axles; connecting rods between the main driving-shaft crank pins and the crank pins of the cranks on the ends of the driving wheel axles, two two-throw engine-crank-shafts placed crosswise of the locomotive with their axes parallel with the axis of the main driving shaft, each engine-crank-shaft consisting of a central disc, two main crank pins, one on each side of said central disc, two outer discs, one on the outer end of each main crank pin, two axial cylindrical members, each extending outwardly from its outer disc to form a main bearing or journal adjoining each outer disc and a driving gear seat adjoining each main bearing or journal, one of said engine-crank-shafts being located above and forward of the main driving shaft and the other of said engine-crank-shafts being located above and rearward of the main driving shaft in a position corresponding with that of the other engine-crank-shaft; a high speed toothed driving gear on the central disc of each engine-crank-shaft, an intermediate speed toothed driving gear on each of the two outer discs of each engine-crank-shaft, a low speed toothed driving gear on each of the two outer ends of each engine-crank-shaft, a high speed toothed driven gear on the main driving shaft to mesh co-incidentally with the high speed driving gears on the two engine-crank-shafts and a clutch arranged to engage and release the same from engagement with the main driving shaft, two intermediate speed toothed driven gears on the main driving shaft, each arranged to mesh co-incidentally with the two corresponding intermediate speed driving gears, one on one engine-crank-shaft and one on the other engine-crank-shaft and a clutch arranged to engage and release each of said gears from engagement with the main driving shaft, two low speed toothed driven gears, one mounted on each of the two cranks of the main driving shaft, and each arranged to mesh co-incidentally with the two corresponding low speed driving gears, one on one engine-crank-shaft and one on the other engine-crank-shaft, and a clutch arranged to engage and release each of said gears from engagement with the main driving shaft and a main frame on each side of the locomotive placed outside of the driving wheels and means in said frame for accommodating the axle journal boxes, the main driving shaft bearing and the engine-crank-shaft bearings.

4. In a Diesel or internal combustion engined locomotive, a plurality of pairs of driving wheels, axles therefor extending outwardly at both ends beyond the hubs thereof, axle journals formed on said extensions next to said hubs, cranks and crank pins on the ends of the said driving wheel axles adjacent said journals, a main driving shaft, a crank and crank pin on each end thereof, the two crank pins being at approximately 90° of each other in direction of rotation, said main driving shaft being parallel with and in the same horizontal plane as the two adjacent driving wheel axles; connecting rods between the main driving shaft crank pins and the crank pins of the cranks on the ends of the driving wheel axles, two two-throw engine-crank-shafts placed crosswise of the locomotive with their axes parallel with the axis of the main driving shaft, each engine-crank-shaft consisting of a central disc, two main crank pins, one on each side of said central disc, two outer discs, one on the outer end of each main crank pin, two axial cylindrical members, each extending outwardly from its outer disc to form a main bearing or journal adjoining each outer disc and a driving gear seat adjoining each main bearing or journal, one of said engine-crank-shafts being located above and forward of the main driving shaft and the other of said engine-crank-shafts being located above and rearward of the main driving shaft in a position corresponding with that of the other engine-crank-shaft; driving gears mounted on said discs and on the outer ends of said engine-crank-shafts, driven gears on the main driving shaft and on the cranks at the ends of said main driving shaft, all in positions corresponding to and adapted to mesh with said driving gears on the engine-crank-shafts, each of said driven gears adapted to mesh co-incidentally with its two corresponding driving gears, one on one of the engine-crank-shafts and one on the other, an individual clutch on each driven gear arranged to engage and release the same from engagement with the main driving shaft and a main frame on each side of the locomotive placed outside of the driving wheels and containing means for accommodating the axle journal boxes, the main driving shaft bearing and the engine crank shaft main bearings; eight Diesel or internal combustion power cylinders, four of them connected to the two crank pins of the forward engine-crank-shaft and four of them connected to the two crank pins of the rear engine-crank-shaft, two of the four which are connected to the forward engine-crank-shaft and two of the four which are connected to the rear engine-crank-shaft being inclined upwardly and forwardly from their respective crank shaft axial centers, and two of the four which are connected to the forward engine-crank-shaft and two of the four which are connected to the rear engine-crank-shaft being inclined upwardly and rearwardly from their respective crank shaft axial centers, the degree of inclination being such that the axial center lines of the two power cylinders which connect to any one common crank pin form as near a 90° angle from the crank shaft center as rail clearance heighth will permit, the centers of all the cylinders which are inclined forward being offset toward the same side of the locomotive and the centers of all the cylinders which are inclined rearwardly being offset toward the opposite side of the locomotive, the amount of offset being sufficient to allow the bodies of those connecting rods from the rearwardly inclined cylinders which are connected to the forward engine-crank-shaft to pass and operate alongside of the bodies of those connecting rods from the forward inclined cylinders which are connected to the rear engine-crank-shaft, the crank pins of the engine crank shafts being each of sufficient length to accommodate the crank pin bearings of two connecting rods on the same crank pin; and engine frames extending from the power cylinders to the longitudinal main frames of the locomotive and secured to same at points adjacent to the seats which carry the main bearings of the engine-crank-shaft to which the respective cylinders are connected.

5. In a Diesel or internal combustion engined locomotive, a plurality of pairs of driving wheels, axles therefor extending outwardly at both ends beyond the hubs thereof, axle journals formed on said extensions next to said hubs, cranks and crank pins on the ends of the said driving wheel axles adjacent said journals, a main driving shaft, a crank and crank pin on each end thereof, the two crank pins being at approximately 90° of each other in direction of rotation, said main driving shaft being parallel with and in the same horizontal plane as the two adjacent driving wheel axles; connecting rods between the main driving shaft crank pins and the crank pins of the cranks on the ends of the driving wheel axles, two two-throw engine-crank-shafts placed crosswise of the locomotive with their axes parallel with the axis of the main driving shaft, each engine-crank-shaft consisting of a central disc, two main crank pins, one on each side of said central disc, two outer discs, one on the outer end of each main crank pin, two axial cylindrical members, each extending outwardly from its outer disc to form a main bearing or journal adjoining each outer disc and a driving gear seat adjoining each main bearing or journal, one of said engine-crank-shafts being located above and forward of the main driving shaft and the other of said engine-crank-shafts being located above and rearward of the main driving shaft in a position corresponding with that of the other engine-crank-shaft; driving gears mounted on said discs and on the outer ends of said engine-crank-shafts, driven gears mounted on the main driving shaft and on the cranks at the ends of said main driving shaft, all in positions corresponding to and adapted to mesh with said driving gears on the engine-crank-shafts, each of said driven gears adapted to mesh co-incidentally with its two corresponding driving gears, one on one of the engine-crank-shafts and one on the other, an individual clutch on each driven gear arranged to engage and release the same from engagement with the main driving shaft and a main frame on each side of the locomotive placed outside of the driving wheels and containing means for accommodating the axle journal boxes, the main driving shaft bearing and the engine-crank-shaft main bearings, eight Diesel or internal combustion power cylinders, four of them connected to the two crank pins of the forward engine-crank-shaft and four of them connected to the two crank pins of the rear engine-crank-shaft, two of the four which are connected to the forward engine-crank-shaft and two of the four which are connected to the rear engine-crank-shaft being inclined upwardly and forwardly from their respective crank shaft axial centers, and two of the four which are connected to the forward engine-crank-shaft and two of the four which are connected to the rear engine-crank-shaft being inclined upwardly and rearwardly from their respective crank shaft axial centers, the degree of inclination being such that the axial center lines of the two power cylinders which connect to any one common crank pin form as near a 90° angle from the crank shaft center as rail clearance height will permit, the centers of all the cylinders which are inclined forward being offset toward the same side of the locomotive and the centers of all the cylinders which are inclined rearwardly being offset toward the opposite side of the locomotive, the amount of offset being sufficient to allow the bodies of those connecting rods from the rearwardly inclined cylinders which are connected to the forward engine-crank-shaft to pass and operate alongside of the bodies of those connecting rods from the forward inclined cylinders which are connected to the rear engine-crank-shaft, the crank pins of the engine-crank-shafts being each of sufficient length to accommodate the crank pin bearings of two connecting rods on the same crank pin; engine frames extending from the power cylinders to the longitudinal main frames of the locomotive and secured to same at points adjacent to the seats which carry the main bearings of the engine-crank-shaft to which the respective cylinders are connected; arch or truss forming braces, to form on each side of the locomotive the compression member of an arch or truss framework for supporting and transferring to the longitudinal main frames of the locomotive at points forward and rearward of the two pairs of driving wheels which are adjacent to the main driving shaft, that portion of the weight of the engine and main driving shaft and their accessory parts required to be so transferred to distribute the weight among the various wheels of the locomotive; equalizing means disposed crosswise of the locomotive and connecting the weight supporting truss or arch on one side of the locomotive with the weight supporting truss or arch on the other side of the locomotive at points both forward and rearward of the engine frames or tie rods of the front and rear power cylinders; and flexible upward force exerting means interposed between each of the equalizing levers or beams and the main frames of the locomotive at points in same forward and rearward of the two pairs of driving wheels which are adjacent to the main driving shaft.

6. In a locomotive, a pair of longitudinal frame members, an axle mounted transversely of said frame and projecting outside the same, wheels on said axle inside said frame, said axle having a movement transversely of said frame, and fluid means tending to hold said axle resiliently in position symmetrically of said frame.

7. In a locomotive, a pair of longitudinal frame members, an axle mounted transversely of said frame and projecting outside the same, wheels on said axle inside said frames, said axle having a movement transversely of said frame, means tending to hold said axle resiliently in position symmetrically of said frame, said means including fluid pressure cylinders at the ends of said axle and means to supply pressure fluid to said cylinders.

8. In a locomotive, a power installation including eight internal combustion power cylinders, forward and rearward engine-crank-shafts, a set of four of said cylinders connected to crank pins of the forward engine-crank-shaft and a set of four of them connected to the crank pins of the rear engine-crank-shaft, two of each set of four being inclined upwardly and forwardly from their respective crank shafts and two of each set of four being inclined upwardly and rearwardly from their respective crank shafts, the degree of inclination being such that the axial center lines of the two power cylinders connecting with any one common crank pin form an angle of approximately 90°, a driving shaft and driving connections between said crank shafts and said driving shaft.

9. In an internal combustion engined locomotive, an engine crank shaft, a driving shaft, interengaging gears on said shafts, the gears on said driving shaft having disc clutches thereon, the discs on some of said clutches being provided with passages therein, to permit the passage of cooling fluid therethrough.

10. In an internal combustion engined locomotive, an engine-crank shaft, a driving shaft, interengaging gears on said shafts, the gears on said driving shaft having disc clutches thereon and means to cool said disc clutches.

11. In a locomotive, a frame including longitudinal side members, a plurality of pairs of driving wheels between said side members, axles fixed in said wheels and extending outwardly therefrom, axle journal boxes in said frame, cranks on the outer ends of said axles, a driving shaft parallel with said axles, an engine crank shaft parallel with said driving shaft, a plurality of gears between said engine crank shaft and said driving shaft, clutches adapted to engage selectively said gears to said driving shaft and connecting rods on the end cranks of said driving shaft and of said axles to deliver the entire driving power from said driving shaft to said axles.

12. In a locomotive, a power installation including eight internal combustion power cylinders, forward and rearward engine-crank shafts, a set of four of said cylinders connected to the crank pins of the forward engine-crank shaft and a set of four of them connected to the crank pins of the rear engine-crank-shaft, two of each set of four being inclined upwardly and forwardly from their respective crank shafts and two of each set of four being inclined upwardly and rearwardly from their respective crank shafts, the degree of inclination being such that the axial center lines of the two power cylinders connecting with any one common crank pin form an angle of approximately 90°, a driving shaft, driving connections between said crank shafts and said driving shaft, a framework for supporting and transferring to the main frame of the locomotive at points adjacent the forward and rearward ends of the said power installation that portion of the weight of the power installation required to be so transferred to distribute the weight among the various wheels of the locomotive and flexible upward force exerting means between the main frame of the locomotive and the forward portion of the said framework and between the main frame of the locomotive and the rearward portion of said frame work.

13. In a locomotive, a power installation in combination with, a framework for supporting and transferring to the main frame of the locomotive at points adjacent the forward and rearward ends of the said power installation that portion of the weight of the power installation required to be so transferred to distribute the weight among the various wheels of the locomotive and flexible upward force exerting means between the main frame of the locomotive and the forward portion of the said framework and between the main frame of the locomotive and the rearward portion of said framework.

14. In a locomotive, a plurality of pairs of driving wheels, axles therefor fixed in and extending outwardly beyond the hubs of said wheels, axle journals adjacent said hubs, cranks and crank pins on the ends of said axles adjacent said journals, axle journal boxes, a main driving shaft, cranks and crank pins on the ends of said shaft, the crank pins being at an angle of approximately 90° to each other in direction of rotation, said main driving shaft being parallel with and in the same horizontal plane as, and equidistant from, the two adjacent driving wheel axles, clutches, the driven member or members of said clutches being so mounted as to rotate with said main driving shaft connecting rods joining the main driving shaft crank pins with the crank pins of the cranks on the ends of the driving wheel axles and adapted to deliver the entire driving power from the said main driving shaft to the said driving wheel axles, and a main frame on each side of the locomotive placed outside of the driving wheels and including means to receive the said journal boxes and the main driving shaft bearing.

15. In a locomotive, a plurality of pairs of driving wheels, axles therefor, a driving shaft parallel with said axles, connecting rods between the crank pins of said driving shaft and crank pins of said driving wheel axles, a forward engine-crank shaft, a rear engine-crank-shaft, eight internal combustion power cylinders, four of them connected operatively with the two crank pins of the forward engine-crank shaft and four of them connected to the two crank pins of the rear engine-crank-shaft, two of the four which are connected to the forward engine-crank-shaft and two of the four which are connected to the rear engine-crank-shaft being inclined upward and forward from their respective crank shaft axial centers, and two of the four which are connected to the forward engine-crank-shaft and two of the four which are connected to the rear engine-crank-shaft being inclined upwardly and rearwardly from their respective crank shaft axial centers.

16. In an internal combustion engined locomotive, longitudinal frame members at each side of said locomotive, driving cylinders set in a position inclined upwardly from said members, and a weight distributing truss for said cylinders including arch forming braces engaging said cylinders at their upper ends, cross frame braces on said frame, and adjustable brackets on said cross frame braces, to abut against the side faces of the lower ends of said arch forming braces and allowing a slight vertical play of said arch forming braces.

In testimony whereof I hereunto affix my signature this 8th day of May, A. D. 1929.

CLARENCE N. SCOTT.